June 24, 1941.  B. SCHWARZ  2,247,313
ALTERNATING CURRENT SERIES MOTOR
Filed Nov. 15, 1938
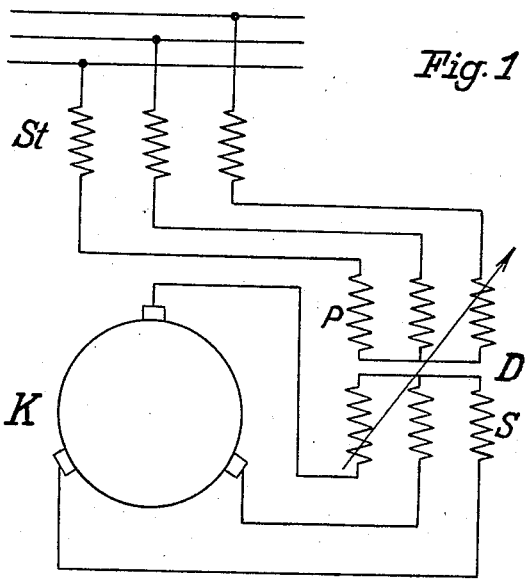
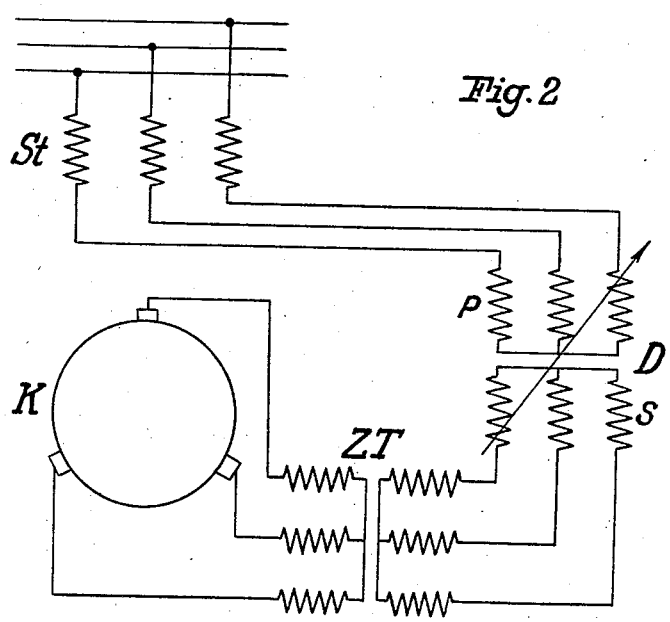
Inventor:
Benno Schwarz
By
Watson, Cole, Grindle &
Watson  Attys.

Patented June 24, 1941

2,247,313

UNITED STATES PATENT OFFICE 2,247,313

ALTERNATING CURRENT SERIES MOTOR

Benno Schwarz, Dusseldorf-Oberkassel, Germany

Application November 15, 1938, Serial No. 240,558
In Germany August 17, 1935

1 Claim. (Cl. 172—276)

Three-phase series motors the armatures of which are substantially connected in series with the stator winding—generally with the interposition of an intermediate transformer—are regulated by brush displacement. Different torque-speed characteristics are obtained according to the relative phase position of the voltage vectors. In order to effect regulation, therefore, the brush gear must be moved, which involves various disadvantages, including the unfavourable influence on the relative position of the brushes with respect to the commutator, the relatively complicated construction of the brush system, which necessitates special constructional measures, particularly in the case of large machines and finally the necessity of controlling the motor mechanically for the purpose of regulation, so that remote control is only possible with a specially provided auxiliary motor for moving the brush gear.

Due to the present invention, it is possible to construct a three-phase series motor with stationary brushes and infinitely-variable regulation without impairing its working characteristics. The principle of the invention will be explained with reference to the drawing in which Figure 1 shows a simple form of the invention and Figure 2 shows a modification.

In Figure 1, St denotes the stator and K the commutator with the set of brushes, which commutator is connected to the armature winding. The stator phases are connected in open manner and are in series with the primary winding P of an induction regulator D, from the secondary winding S of which the brush system is fed. The simple induction regulator shown represents a transformer of constant transformation ratio, the secondary voltage vector of which can be rotated as desired relatively to the primary voltage. The rotary induction regulator may be of any known type of construction. It may for instance be a wound rotor induction motor having the proper transformation ratio. An enlarged motor of the "Selsyn" type would be satisfactory. Because of the rotating field resulting from the polyphase current used the transformation ratio remains constant in spite of the relative movement between stator and rotor necessary to obtain the desired phase shift in the current. Consequently, the relative phase position between the secondary voltage and the commutator voltage varies without the position of the brush yoke having to be shifted and without the selected winding transformation ratio between the stator and rotor varying. The induction regulator will as a rule also replace the intermediate transformer otherwise employed for series motors, as it is permissible to arrange the voltage transformation ratio so as to comply with the requirements of the commutator voltage or commutator current. As will be at once appreciated, the induction regulator may be erected at any desired spot and thereby provide a remote control of the motor without mechanical action on the brush gear of the latter. Should there be a considerable distance between the motor and the induction regulator, it is possible to employ in addition an intermediate transformer ZT, preferably mounted near the motor, as indicated in Figure 2, the use of large conductors for the transmission of the comparatively heavy commutator currents being thus avoided.

I claim:

In a three-phase series motor, in combination, a stator having open windings for connection to a source of current, a wound rotor having a commutator, fixed brushes cooperating with said commutator, an induction regulator having a primary winding connected in series with said stator windings and having a secondary winding connected to said brushes, said regulator being adjustable to progressively change the phase angularity between its windings and having a constant transformation ratio in all adjustments.

BENNO SCHWARZ.